(12) United States Patent
Webb

(10) Patent No.: US 7,550,100 B2
(45) Date of Patent: Jun. 23, 2009

(54) PROCESS AND APPARATUS FOR THE PRODUCTION OF PAPER PRODUCTS

(75) Inventor: Donald Barry Webb, Tallai (AU)

(73) Assignee: Fibrecycle Pty Ltd, Mudgeeraba, Queensland (AU)

( * ) Notice: Subject to any disclaimer, the term of this patent is extended or adjusted under 35 U.S.C. 154(b) by 839 days.

(21) Appl. No.: 10/511,374

(22) PCT Filed: Dec. 5, 2002

(86) PCT No.: PCT/AU02/01642

§ 371 (c)(1),
(2), (4) Date: Mar. 23, 2005

(87) PCT Pub. No.: WO03/089229

PCT Pub. Date: Oct. 30, 2003

(65) Prior Publication Data

US 2006/0231967 A1    Oct. 19, 2006

(30) Foreign Application Priority Data

Apr. 18, 2002 (AU) .................................... PS1814

(51) Int. Cl.
*B29B 9/06* (2006.01)

(52) U.S. Cl. .............. 264/118; 264/140; 264/109; 264/319; 162/903; 162/173; 425/371; 425/209; 425/204; 425/363

(58) Field of Classification Search .............. 162/173, 162/903; 264/118, 109, 140, 319; 425/209, 425/204, 363, 371; 366/85, 318
See application file for complete search history.

(56) References Cited

U.S. PATENT DOCUMENTS

| | | | | |
|---|---|---|---|---|
| 1,288,025 A | 12/1918 | Kennedy | ..................... | 222/280 |
| 2,796,810 A | 6/1957 | Müller | ....................... | 162/290 |
| 4,619,381 A | 10/1986 | Wurtz | ......................... | 222/272 |
| 4,778,046 A | 10/1988 | Hashimoto et al. | .......... | 198/819 |
| 5,614,227 A | 3/1997 | Yarbrough | ............... | 425/133.1 |
| 5,725,783 A | 3/1998 | Hodén | ........................ | 210/770 |
| 6,508,965 B1 | 1/2003 | Webb | ......................... | 264/118 |

FOREIGN PATENT DOCUMENTS

| | | |
|---|---|---|
| SE | 9500334 | 8/1996 |
| WO | WO92/01833 | 2/1992 |
| WO | WO94/19539 | 9/1994 |
| WO | WO98/43805 | 10/1998 |

OTHER PUBLICATIONS

International Search Report for PCT/AU02/01642 (Feb. 19, 2003).

*Primary Examiner*—Mark Halpern
(74) *Attorney, Agent, or Firm*—Howrey LLP

(57) ABSTRACT

A process and apparatus for producing a paper product, in which paper (M) in a particular form, and mixed with water, is subjected to pressure to form a compacted mass which involves, or includes, depositing the mix onto a first conveyor belt (10) and then progressively forming the conveyor belt into an upwardly open U-shape configuration and compressing the mix by means of a second conveyor belt (20) guided to progressively enter the first conveyor belt and progressively compact the mix.

5 Claims, 2 Drawing Sheets

PROCESS AND APPARATUS FOR THE PRODUCTION OF PAPER PRODUCTS

This is a national stage filing under 35 U.S.C. § 371 of International Application No. PCT/AU02/01642 filed Dec. 5, 2002, which claims priority based on Australian Patent Application No. PS 1814 filed Apr. 18, 2002.

TECHNICAL FIELD

This invention relates to a process and apparatus for the production of paper products, such as moisture absorbing products or a combustible paper fuel.

In the case of a moisture absorbing product, such may be capable of absorbing liquids without losing its shape, and in particular, but not exclusively, such a product in a pelletised form. One embodiment of the invention has been particularly developed for use as "cat litter", although it may be used for other purposes where its moisture absorbing properties are required.

BACKGROUND ART

Some products which have been available for use as "cat litter" or for other moisture (liquid) absorbing purposes, are formed from clay based materials and are non-organic with the resulting problem that they will not decompose. In addition they have the added disadvantage of depositing clay powder on the paws of cats which is subsequently transferred to floor surfaces leaving tracks. In addition such products result in the continued use of mineral resources whilst more recently certain cultivated pasture crops have been unnecessarily harvested and used merely for the purposes of "cat litter".

In the case of paper fuel it may be composed of a relatively high percentage of paper. Whilst paper combusts readily it cannot be used in its basic form as it either burns too quickly in its loose sheet form or will not burn satisfactory when in the form of a thick mass. In addition, it is important to consider the physical transportation of recyclable paper in its normal form from collection zones to points of use for heating and/or cooking.

As a result of a heightening of community awareness, the supply of paper for recycling has increased to such a degree that it, in many cases, far exceeds the demand for conventional products made from such recycled paper, and as a result the excess is disposed of by landfilling or exported usually at the cost of the country.

In International patent application no. PCT/AU91/00308 (Publication no. WO92/01833) there is disclosed a process and an apparatus for the production of paper products, such as "cat litter" or paper fuel, comprising reducing paper to a particulate form by shredding and grinding, conveying the particles of paper as a layer on a first conveyor firstly beneath a first levelling and compacting roller and thereafter beneath a first set of water sprays, before discharging from the conveyor onto a second conveyor through a rearwardly inclined transfer chute to invert the layer during transfer. The inverted layer on the second conveyor passes firstly beneath a second levelling and compacting roller and thereafter beneath a second set of water sprays. The paper product is completed by extruding the paper and water mixture and cutting the extruded mix into pellets before subjecting the pellets to dehydration. In the case of paper product to be used as paper fuel, the paper is mixed with coal dust.

In International patent application no. PCT/AU98/00206 (publication No. WO98/43805) there is disclosed a process and an apparatus for the production of paper products, such as "cat litter" or paper fuel, comprising reducing paper to a particulate form by shredding and grinding, conveying the particles of paper from a hopper as a layer on a first conveyor firstly beneath a levelling and compacting roller and thereafter beneath a set of water sprayers, before discharging from the conveyor onto a second conveyor with the assistance of a rearwardly baffle plate to invert the layer during transfer. The inverted layer on the second conveyor passes to a third conveyor belt which moves through a ring which has the effect of wrapping the belt over itself and around the mix to form a tunnel enveloping and compacting the mix. The paper product is subsequently extruded and again cut into pellets before subjecting the pellets to dehydration, and in the case of paper product to be used as paper fuel, the paper is mixed with coal dust. The bottom of the hopper contains a plurality of rotatable worm screws for discharging the paper evenly across the conveyor, whilst rotatable paddle type agitators are also contained in the bottom of the conveyor to prevent the particulate paper from agglomerating into lumps.

The processes and apparatus referred to above has proved effective for the production of paper products, but some difficulties have been encountered in effectively compacting or compressing the paper and water mixture for extrusion and subsequent cutting into pellets, and, although the use of a conveyor moving through a ring to wrap the belt over itself and around the mix to form a tunnel enveloping and compacting the mix, and as disclosed in publication no. WO98/43805, can be effective it is not always consistent whilst frictional forces between the belt and the ring can cause accelerated belt wear, whilst also necessitating the selection of a more highly powered motor for the belt drive than would be required to merely drive the conveyor belt and thus increasing the plant cost.

DISCLOSURE OF THE INVENTION

It is therefore an object of the present invention to provide a process and apparatus for compacting or compressing a paper and water mixture on a conveyor for subsequent extrusion and cutting into pellets.

According to the invention there is envisaged a process for producing a paper product, in which paper in a particular form, and mixed with water, is subjected to pressure to form a compacted mass which involves, or includes, depositing the mix onto a first conveyor belt and then progressively forming the conveyor belt into an upwardly open U-shape configuration and compressing the mix by means of a second conveyor belt guided to progressively enter the first conveyor belt and progressively compact the mix.

The invention also envisages an apparatus for producing a paper product, wherein paper in a particulate form and mixed with water is to be subjected to pressure to form a compacted mass, said apparatus including a first conveyor belt, means to progressively form the first conveyor belt into an upwardly open U-shaped configuration, and a second conveyor belt with means to progressively guide the second conveyor belt into the first conveyor belt to progressively compact the mix.

The invention still further envisages a paper product resulting from the process and apparatus of the invention defined above.

In one preferred embodiment of the invention the process and apparatus produces a paper product for use as a moisture absorbing medium.

In another preferred embodiment the process and apparatus produces a combustible fuel formed primarily from particles of compressed paper combined at least with coal dust.

Preferably, in the case of a combustible fuel, a proportion of calcium oxide is also added to the mix.

One preferred embodiment of the process and apparatus of the invention will now be described with reference to the accompanying drawings, in which;

BRIEF DESCRIPTION OF THE DRAWINGS

FIG. 3 is a cross-sectional view taken along line 3-3 of FIG. 1, FIG. 4 is a cross-sectional view taken along line 4-4 of FIG. 1, and FIG. 5 is a cross-sectional view taken along line 5-5 of FIG. 1.

BEST MODE FOR CARRYING OUT THE INVENTION

Figure 1:
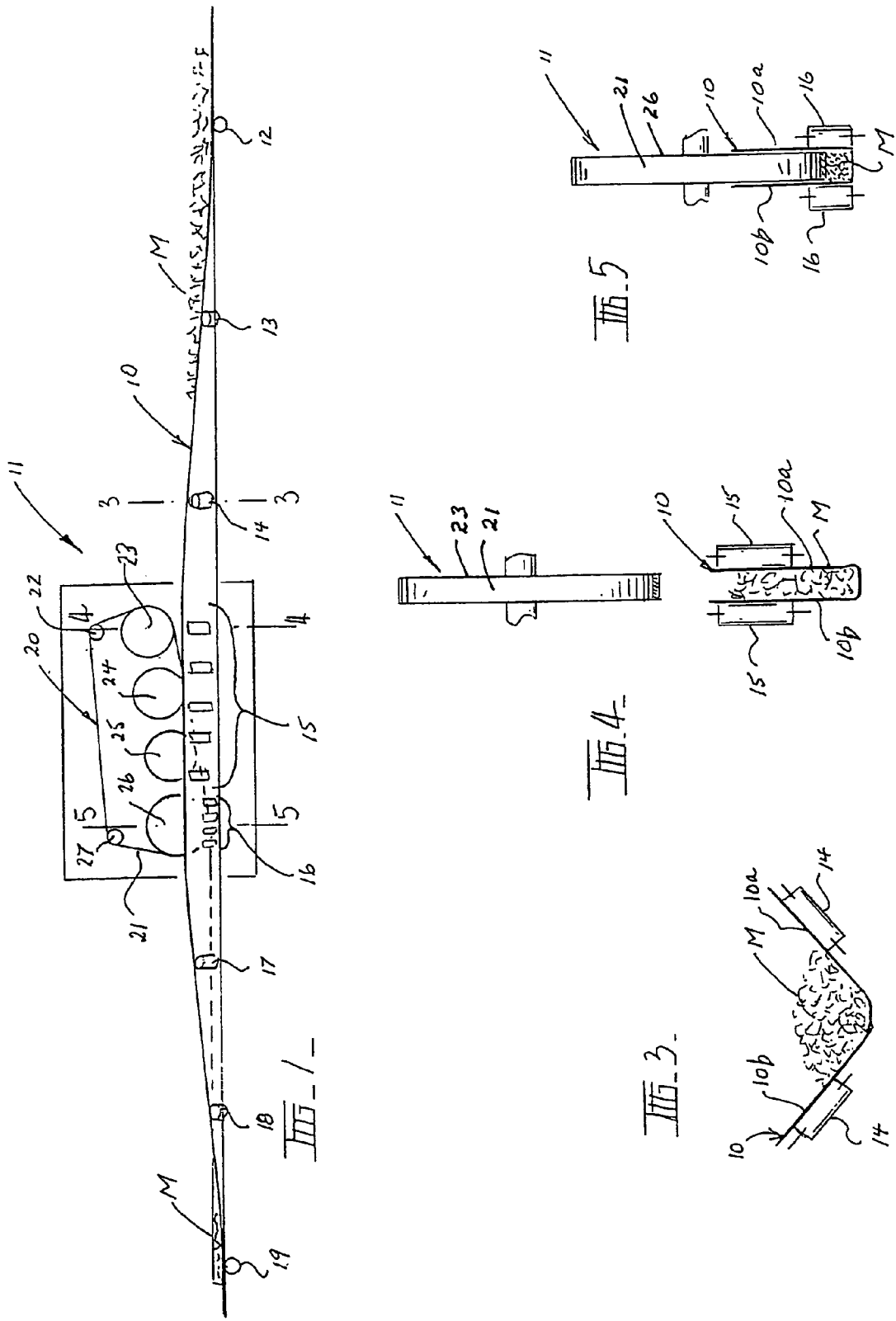
FIG. 1 is a side elevational view of part of an apparatus for carrying out the process of the invention.
Figure 2:
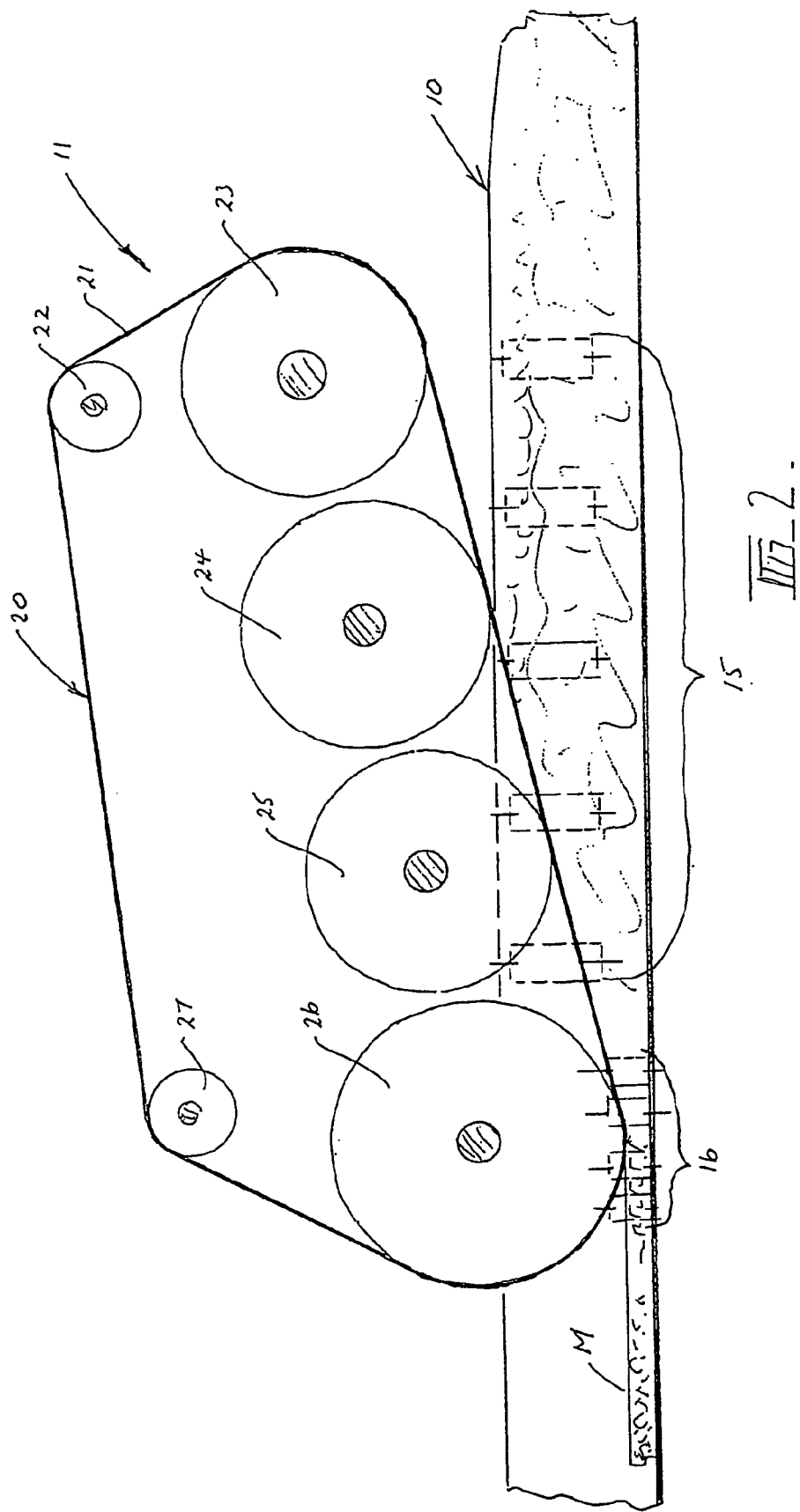
FIG. 2 is an enlarged side elevational view of part of the apparatus of FIG. 1.

In this preferred embodiment of the invention, as applied to producing a moisture absorbing product, and as disclosed in the aforementioned International patent applications, the recycled paper used is primarily newsprint which is ground in available paper grinding equipment down to a paper fluff suitable for subsequent compression and binding. Water is then added to the paper fluff to achieve an overall water content of between 25-30%.

The mixture of paper and water is then extruded under high pressure, thought to be in excess of 2,000 MPa, and then divided into moisture absorbing pellets having a surface area of between 110 $mm^2$ and 210 $mm^2$ and a length of between 5 mm and 15 mm.

The pellets are then finally dehydrated by a drying process to reduce their moisture content to something less than 10%.

The resultant pellets are capable of absorbing in excess of twice their own weight of water without substantially changing their shape and are also substantially free of paper dust. After use, for example as "cat litter", the pellets can be readily disposed of by digging into soil as an organic, decomposable, non-toxic soil conditioner, or flushed into sewerage systems.

Other suitable uses of the pellets is as water retention masses and soil conditioners to aid the cultivation of plants.

As applied to paper fuel the particle size produced from the grinding operation should be such as to range from paper fluff to particles having a surface area up to 5 $cm^2$ whilst the fluff should not be less than 30% of the total paper mix.

The ground paper is then mixed with coal dust, calcium oxide and water. The coal dust can be a by-product of the manufacturer of briquettes, and may range in particle size up to 1.5 mm in diameter and blended with the ground paper in the ratio between 2:1 and 4:1 paper to coal dust. The calcium oxide component should be 1 part per 100 of the paper and coal mix and sufficient water added to result in a moisture content for the mix of between 25 to 30%.

The above mixture is then extruded under high pressure, thought to be in excess of 2,000 MPa, and divided into units of fuel having a surface area between 60 $cm^2$ and 100 $cm^2$, with a length between 3 cm and 6 cm and a mass in excess of 1.00 gms per $cm^3$ of dry weight.

The extruded units are then finally dehydrated by a drying process to reduce the moisture content of the units for something less than 13.5%.

The resultant combustible fuel is in effect clean, readily packaged units suitable for domestic, commercial and/or industrial purposes, such as for heating, and the blend of the mixture and the degree of compression is such as to have an overall energy value of 15 MJ/kg.

In accordance with this preferred embodiment of the present invention, the process as applied to the production of a moisture absorbing paper product, or a predominantly paper based combustible fuel, involves taking raw material (waste paper) from a storage, passing it through a preliminary sizing process to reduce (shred) the waste paper to a manageable size for subsequent grinding in a grinding plant to paper fluff. The paper fluff is subsequently aspirated, whereafter the fluff is settled and subsequently conditioned by application of water and then compressed or compacted. The paper product is then transferred to extruding equipment where it is extruded in a pellet mill into a continuous length and cut to individual pellet lengths, before being dried in a dryer. The process is completed by a sizing operation to remove undersized and oversized pellets (including dust particles), for subsequent transfer to a finished product dispatch station.

The part of the apparatus for carrying out the aspiration, settling and conditioning steps of the process is basically the same as that disclosed in the aforementioned publication no. WO98/43805, and comprises, a storage bin or hopper from which ground paper gravitates as a layer onto the upper run of a first stage conveyor belt driven to run at a speed of in the order of 1 meter per second and then beneath a first pivoted levelling and pressurising roller which serves to compact the layer of ground paper on the conveyor belt to a thickness of between 10 to 20 mm. Because of the pivoted support for the levelling and pressurising roller, it is free floating to ride over larger objects or masses of material. The compacted paper fluff is then passed on the conveyor belt beneath a first flow sensor, in the form of a micro-switch, which confirms that there is a layer of material on the conveyor belt.

The material on the first stage conveyor belt then passes beneath a first set of spraying jets, supplied with water through a supply conduit, and only operable if the first flow sensor has detected the presence of material on the conveyor. The moistened (conditioned) material on the conveyor belt then moves beneath a second flow sensor which confirms that there is still a layer of material on the conveyor belt, and then gravitates over a discharge end of the first stage conveyor belt and against a baffle plate onto the trailing end of a second stage conveyor belt the upper run of which is travelling in the opposite direction to the upper run of the first stage conveyor belt, and in the process the material is also inverted to expose the opposite side of the material to firstly what may be a second free floating pivoted levelling and pressurising roller and thereafter what may be a second set of spraying jets, and also supplied with water through a supply conduit, and the aspirated, settled, conditioned and compacted mass of paper fluff is then transferred to the extruder where it is extruded and cut to the required pellet size, before drying and sizing.

In the case of paper fuel, the ground paper, before being supplied to the storage bin or hopper, is mixed with a proportion of coal dust and a proportion of calcium oxide, and the mixture is thereafter subjected to aspiration, settling and conditioning in the apparatus described above.

Modulator valves control the volume of water sprayed onto the material by the spraying jets above both the first stage conveyor belt and also possibly above the second stage conveyor belt, and the volume of the sprays is controlled to be dependent on the speed of the respective conveyor belts.

The first and second stage conveyor belts may have a plurality of spaced apart cleats extending transversely of their length which serve to not only assist in conveying the material, but also to control the thickness of material between the preferred limits of 10 to 20 mm.

In relation particularly to a moisture absorbing paper product, the process of this preferred embodiment of the invention can achieve bulk densities of product up to 660 kg/m$^3$ with a relatively slow throughput, and less friable for use as a "cat litter" for example, whilst in relation to a low density product capable of rapidly absorbing floor spills, such as oils, bulk density of between 300 to 500 kg/m$^3$ are desirable.

As with the disclosure in patent publication no. WO98/43805, the bottom of the bin or hopper at its discharge opening therefrom has means to control the discharge of shredded and ground paper therefrom onto the first stage conveyor to provide what may be known as a "live" bottom device and consisting of a plurality (in this case three) worm screws mounted for rotation on shafts to continuously move the paper rearwardly of the bin relative to the forward motion of the upper run of the conveyor and ensure even discharge of the paper through the discharge opening and onto the upper run of the first stage conveyor, whilst above the respective worm screws there are once again three paddle type agitators mounted for rotation on shafts which agitate the particulate paper to prevent it from agglomerating into lumps of paper which would adversely effect its controlled discharge and the laying of an even thickness of the paper mat on the conveyor. With such a "live" device in the bottom of the bin or hopper, effective constant and even control of the flow and rate of discharge of the dry form of the particulate paper is achieved, whereby the discharge is even laterally across the surface of the conveyor whilst preventing the accumulation of paper at the front end of the bin or hopper which would interfere with the even discharge therefrom. The effect of both the worm screws and the agitators is to increase the density of the paper mat; enhance the matting effect; and increase throughput of paper without having to increase conveyor size and/or its conveying speed.

In accordance with the preferred embodiment of the present invention, with particular reference to the drawings, the discharge end of the second stage conveyor belt discharges the paper and water mix onto the trailing upper end of a third stage conveyor belt 10 extending at right angles to the discharge end of the second stage conveyor and which conveys the mix M through a compacting apparatus generally indicated as 11.

In this preferred embodiment of the invention the compacting apparatus 11 comprises a series of rollers 12, 13, 14, groups of rollers 15 and 16, and subsequent rollers 17, 18 and 19. The roller 12 underlies the conveyor belt 10 in its substantially flat or slightly troughed condition, whilst rollers 13 and 14 are angled upwardly on either side of the conveyor belt, with rollers 14 being angled greater than rollers 13, whilst the group of rollers 15 are orientated substantially vertically. The effect of rollers 13, 14 and 15 is to progressively fold the side portions 10a and 10b of the conveyor 10 upwardly to form a U-shaped configuration as shown in FIGS. 4 and 5, whilst at the same time laterally compressing the mix M between the side portions 10a and 10b of the conveyor 10.

Disposed above the conveyor 10 is a compacting conveyor 20 consisting of an endless conveyor belt 21 trained around rollers 22, 23, 24, 25, 26 and 27, at least one of which is driven to drive the belt 21 at the same speed as the belt of the conveyor 10. The rollers 23, 24, 25 and 26 for the lower run of the conveyor belt 21 are positioned progressively lower whereby the lower run of the belt moves progressively downwardly into the conveyor 10 to vertically compact the mix M. After exiting from beneath the compacting conveyor 20 and guided by the rollers 17, 18 and 19 which are at progressively shallower angles, the side portions 10a and 10b of the conveyor 10 fold downwardly until the conveyor returns to a substantially flat or slightly troughed condition carrying an elongated compressed or compacted stream of the mix M which may subsequently be subjected to extrusion and dehydration before or after being cut into pellets.

It is perceived that the compaction (compression) of the paper mix within the third stage conveyor 10 will control the surface adhesion of the paper within the mix; and maximise the mass and density of the mix up to the four times; whilst allowing ease of introduction of additives into the mix during compaction (compression) thereof.

The invention claimed is:

1. A process for producing a paper product, in which paper in a particulate form, and mixed with water, is subjected to pressure to form a compacted mass, said process comprising the steps of: depositing the mix onto a first conveyor belt and then progressively forming the conveyor belt into an upwardly open U-shape configuration and compressing the mix using a second conveyor belt guided to progressively enter the first conveyor belt and progressively compact the mix.

2. A process for producing a paper product as claimed in claim 1, further comprising the steps of extruding the compacted mass and dehydrating the compacted mass to reduce its moisture content.

3. A process for producing a paper product as claimed in claim 1, wherein coal dust is added to the mix.

4. A process for producing a paper product as claimed in claim 1, wherein calcium oxide is also added to the mix.

5. An apparatus for producing a paper product, wherein paper in a particulate form and mixed with water is subjected to pressure to form a compacted mass, said apparatus including:

a first conveyor belt;
means for progressively forming the first conveyor belt into an upwardly open U-shaped configuration; and
a second conveyor belt with means for progressively guiding the second conveyor belt into the first conveyor belt to progressively compact the mix.

* * * * *